(12) United States Patent
Anker et al.

(10) Patent No.: US 12,344,542 B2
(45) Date of Patent: Jul. 1, 2025

(54) WASTEWATER TREATMENT DEVICE AND METHOD

(71) Applicant: ARIEL SCIENTIFIC INNOVATIONS LTD., Ariel (IL)

(72) Inventors: Yaakov Anker, Salit (IL); Alexander Gimburg, Itamar (IL)

(73) Assignee: Ariel Scientific Innovations Ltd., Ariel (IL)

( * ) Notice: Subject to any disclaimer, the term of this patent is extended or adjusted under 35 U.S.C. 154(b) by 192 days.

(21) Appl. No.: 18/110,741

(22) PCT Filed: Aug. 22, 2021

(86) PCT No.: PCT/IB2021/057694
§ 371 (c)(1),
(2) Date: Feb. 16, 2023

(87) PCT Pub. No.: WO2022/043846
PCT Pub. Date: Mar. 3, 2022

(65) Prior Publication Data
US 2024/0158270 A1 May 16, 2024

Related U.S. Application Data

(60) Provisional application No. 63/069,018, filed on Aug. 22, 2020.

(51) Int. Cl.
*C02F 3/30* (2023.01)
*C02F 103/00* (2006.01)

(52) U.S. Cl.
CPC ........ *C02F 3/301* (2013.01); *C02F 2103/001* (2013.01); *C02F 2103/002* (2013.01)

(58) Field of Classification Search
CPC .......... C02F 2103/001; C02F 2103/002; C02F 2103/005; C02F 3/104; C02F 3/1294; C02F 3/2806; C02F 3/301; Y02W 10/37
See application file for complete search history.

(56) References Cited

U.S. PATENT DOCUMENTS 5,205,935 A * 4/1993 Ruocco ................. C02F 3/1231
210/603
6,306,304 B1 * 10/2001 Sweet ................... C02F 3/1294
210/138

(Continued)

FOREIGN PATENT DOCUMENTS

CA    2 999 668 A1    9/2018
CN    104118940 A    10/2014
(Continued)

OTHER PUBLICATIONS

International Search Report for PCT application PCT/IB2021/057694, prepared by the Israel Patent Office, Nov. 28, 2021.

(Continued)

*Primary Examiner* — Dirk R Bass
(74) *Attorney, Agent, or Firm* — The Law Office of Joseph L. Felber

(57) ABSTRACT

Disclosed are methods and devices that are useful for processing wastewater, such as stormwater runoff, greywater, blackwater and combinations thereof. In some embodiments of the devices, water is drawn from relatively deep in a microbial processing container, aerated with a Venturi air pump, and subsequently expelled to a relatively shallow part of the microbial processing container.

20 Claims, 3 Drawing Sheets

(56) References Cited

U.S. PATENT DOCUMENTS

| | | |
|---|---|---|
| 2018/0186669 A1 | 7/2018 | Anker et al. |
| 2018/0280907 A1 | 10/2018 | Zhu et al. |
| 2021/0171380 A1 | 6/2021 | Wang et al. |
| 2022/0073390 A1 | 3/2022 | Messias de Araújo, Jr. |

FOREIGN PATENT DOCUMENTS

| | | |
|---|---|---|
| CN | 109384357 A | 2/2019 |
| WO | 2009096797 A1 | 8/2009 |
| WO | 2020/124179 A1 | 6/2020 |

OTHER PUBLICATIONS

Written Opinion for PCT application PCT/IB2021/057694, prepared by the Israel Patent Office, Nov. 28, 2021.

* cited by examiner

WASTEWATER TREATMENT DEVICE AND METHOD

RELATED APPLICATION

The present application gains priority from U.S. Provisional Patent Application 63/069,018 filed 22 Aug. 2020 which is included by reference as if fully set-forth herein.

FIELD AND BACKGROUND OF THE INVENTION

The invention, in some embodiments, relates to the field of wastewater treatment and more particularly, but not exclusively, to methods and devices that are useful for microbial treatment of wastewater.

Blackwater is wastewater from toilets and such that likely contains pathogens. Blackwater is typically foul-smelling and includes relatively large concentrations of feces and urine.

Greywater is wastewater that results from activities such as preparing food, washing clothes and dishes as well as human washing and bathing. Greywater is typically non-blackwater from residential and commercial areas which sources include kitchens, sinks, baths, washing machines and dishwaters. Greywater typically includes few pathogens so may be used for non-potable applications such as irrigation. If stored, the quality of greywater quickly deteriorates.

Stormwater runoff is wastewater that originates from precipitation on urban areas that is collected in a drainage system. Stormwater runoff may collect pollutants from the ground.

It is known to process wastewater blackwater and/or greywater and/or stormwater runood, together or separately) by microbial processing. Specifically, the wastewater is held in a container of a wastewater treatment device under conditions and for a duration that destroy pathogens and allows microbes to digest organic material producing pathogen-free effluent water that is devoid of foul smells. Operation of a wastewater treatment device requires space (to hold the wastewater during the processing) and energy, inter Cilia, for operation of circulation pumps and/or aeration devices.

It is desirable to have methods and/or devices that are useful for wastewater processing.

SUMMARY OF THE INVENTION

The invention, in some embodiments, relates to the field of wastewater treatment and more particularly, but not exclusively, to methods and devices that are useful for microbial treatment of wastewater. Specifically, in some embodiments the invention relates to a waste water treatment device that processes wastewater relatively quickly so that a given size device is able to process a relatively large volume of wastewater.

According to an aspect of some embodiments of the invention, there is provided a wastewater treatment device, comprising:

a. a microbial processing container defining an internal volume that, when positioned for operation, has a top and a bottom at a depth of at least about 3.25 m from the top, wherein:

a bottom-most horizontal layer of the internal volume that is at least 1 m deep is designated as an anaerobic layer that during operation of the device is filled with wastewater;

a horizontal layer of the internal volume immediately above the anaerobic layer and that is at least 2 m deep is designated as an aerobic layer that during operation of the device is substantially filled with wastewater; and a horizontal layer of the internal volume immediately above the aerobic layer is designated as a humid layer that during operation of the device substantially contains a gas;

b. a wastewater inlet positioned to direct influent wastewater into the aerobic layer of the internal volume;

c. a water outlet positioned to remove water from the aerobic layer of the internal volume as effluent, the water outlet at least one meter distant from the wastewater inlet and at least 2 meters above the bottom of the internal volume;

d. at least one water circulation pump, each such water circulation pump having:

a pump inlet positioned to draw water from the aerobic layer and/or the anaerobic layer at least 1 meter below the top of the internal volume, and a pump outlet positioned to expel drawn water to a portion of the internal volume corresponding to the aerobic layer at least 1.5 meter above the bottom of the internal volume, wherein the pump inlet is positioned deeper in the internal volume than the pump outlet;

e. a Venturi air pump positioned on a water conduit between the water circulation pump and each associated the pump outlet, the Venturi air pump having a motive fluid inlet, a side inlet in fluid communication with ambient air and a Venturi outlet, so that water pumped by the water circulation pump into the motive fluid inlet and flowing towards the pump outlet via the Venturi outlet draws ambient air through the side inlet to aerate the pumped water; and f. particulate substrate at least about 3.25 m-deep falling the anaerobic layer, the aerobic layer and the humid layer of the internal volume.

Typically, the circulation pump inlets are configured to avoid ingestion of substrate particles, for example, including a filter, grating or similar such component.

In some embodiments, the total pumping capacity of the device provided by all of the water circulation pump or pumps is at least 1.5 times the wastewater holding capacity of the internal volume of the processing container/day.

In some embodiments, the humid layer is at least 0.25 m deep.

In some embodiments, the humid layer and the aerobic layer are separated by a physical water-permeable barrier (e.g., geotextile) which barrier defines a humid/aerobic boundary.

In some embodiments, the aerobic layer and the anaerobic layer are separated by a physical water-permeable barrier (e.g., geotextile) which barrier defines an aerobic/anaerobic boundary. In some such embodiments, the circulation pump rests or circulation pumps rest on the water-permeable barrier.

In some embodiments, the pump inlet is or pump inlets are positioned to draw water from the anaerobic layer. In some such embodiments, the aerobic layer and the anaerobic layer are separated by a physical water-permeable barrier which barrier defines an aerobic/anaerobic boundary; and the pump inlet is or pump inlets are positioned below the water permeable barrier to draw water from the anaerobic layer. In some embodiments, the pump inlet is or pump inlets are positioned to draw water from a boundary between the aerobic layer and the anaerobic layer. In some such embodiments, the aerobic layer and the anaerobic layer are separated by a physical water-permeable barrier which barrier defines an aerobic/anaerobic boundary; and the pump inlet is or pump inlets are positioned at the level of the water permeable barrier to draw water from a boundary between the aerobic layer and the anaerobic layer. Such an embodiment is depicted in FIG. 2.

In some embodiments, the pump inlet is or pump inlets are positioned to draw water from the aerobic layer. In some such embodiments, the aerobic layer and the anaerobic layer are separated by a physical water-permeable barrier which barrier defines an aerobic/anaerobic boundary; and the pump inlet is positioned above the water permeable barrier to draw water from the aerobic layer. In some such embodiments, the pump inlet is or pump inlets are positioned to draw water from within 50 cm of the anaerobic layer.

In some embodiments, the at least one water circulation pump is located inside the internal volume of the microbial processing container so that during operation of the device, the at least one water circulation pump is submerged in the liquid contents of the microbial processing container.

In some embodiments, the at least one circulation pump is located inside an inner volume of a shaft that during operation of the device is filled with water, the shaft providing a substrate-free channel from the top of the humid layer, through the humid layer and into the aerobic layer. In some embodiments having multiple circulation pumps it is preferred that the device comprises multiple shafts, each circulation pump located inside a different shaft. In some such embodiments, the at least one circulation pump is located at a bottom of the shaft, In some embodiments, the at least one circulation pump rests on a boundary between the aerobic layer and the anaerobic layer, in some such embodiments the boundary defined by a water permeable barrier.

In some embodiments, the shaft is or shafts are defined by a water-permeable shaft-wall that allows fluid communication between the inner volume of the shaft or shafts and the aerobic layer.

In some embodiments, the shaft or shafts are defined by a water-impermeable shaft wall that prevents fluid communication between an inner volume of the shaft or shafts and the aerobic layer, the shaft or shafts configured to allow fluid communication between the inner volume of the shaft or shafts and the anaerobic layer.

In some embodiments, the volume of the aerobic layer is at least 2 times that of the anaerobic layer.

In some embodiments, the particulate substrate is selected from the group consisting of rock, tuff, pumice, slag, lower coal slag, concrete, concrete fragments and combinations thereof.

In some embodiments, not more than 5% by weight of the particulate substrate in the aerobic layer and in the anaerobic layer has a size of less than 0.5 cm and not more than 5% by weight of the particulate substrate in the aerobic and in the anaerobic layers has a size of greater than 15 cm.

In some embodiments, the average size of the particulate substrate in the anaerobic layer is larger than the average size of the particulate substrate in the aerobic layer and in the humid layer.

In some embodiments, the anaerobic layer is filled with substrate particles having a size of 2 cm to 5 cm, the aerobic layer is filled with substrate particles having a size of 1 cm to 3 cm and the humid layer is filled with substrate particles having a size of 0.2 cm to 0.7 cm.

In some embodiments, the aerobic layer comprises an inlet zone in proximity of the wastewater inlet where an average size of substrate particles is greater than in other parts of the aerobic layer. In some such embodiments, the average size of substrate particles in the inlet zone is the same as the average size of substrate particles in the anaerobic layer. In some embodiments, the inlet zone is separated from the rest of the aerobic layer with a water-permeable layer such as geotextile.

In some embodiments, the aerobic layer comprises an outlet zone in proximity of the water outlet where an average size of substrate particles is greater than in other parts of the aerobic layer. In some such embodiments, the average size of substrate particles in the outlet zone is the same as the average size of substrate particles in the anaerobic layer. In some embodiments, the outlet zone is separated from the rest of the aerobic layer with a water-permeable layer such as geotextile.

In some embodiments, the the circulation pump outlet is or circulation pump outlets are positioned to expel drawn water to a portion of the internal volume corresponding to the aerobic layer within 50 cm of a boundary between the aerobic layer and the humid layer, and in some embodiments within 25 cm and even within 10 cm of the boundary.

In some preferred embodiments:
the wastewater inlet and the circulation pump outlet or outlets are near (within 4 m, within 3 m and even within 2 m) a proximal end of the processing container;
the water outlet and the circulation pump inlet or inlets are near (within 4 m, within 3 m and even within 2 m) a distal end of the processing container; and
said circulation pump inlet or inlets are deeper in said processing container than said circulation pump inlet or inlets,
so that: when the device is in operation, wastewater in the processing container moves cyclically:
from the circulation pump outlet or outlets, down and towards the distal end of the processing container substantially parallel to a proximal end—distal end axis of the processing container towards the circulation pump inlet or inlets, into the circulation pump inlet or inlets, through the water circulation pump or pumps, and up and towards the proximal end of the processing container.

According to an aspect of some embodiments of the invention, there is also provided method for processing wastewater, comprising:
a. providing a device according to the teachings herein; and
b. adding influent wastewater to be processed through the wastewater inlet into the internal volume of the processing container and removing effluent water from the processing container through the water outlet,
wherein the rate of the adding the influent wastewater and the removing the effluent water is such that the residence time of water in the internal volume is at least 12 hours and not more than 48 hours so that the effluent water is suitable for irrigation. In some embodiments, the residence time is at least 14 hours, at least 16 hours, at least 18 hours, at least 20 hours and even at least 22 hours. Additionally or alternatively, in some embodiments, the residence time is not more than hours, not more than 36 hours, not more than 30 hours and even not more than 28 hours.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1A:
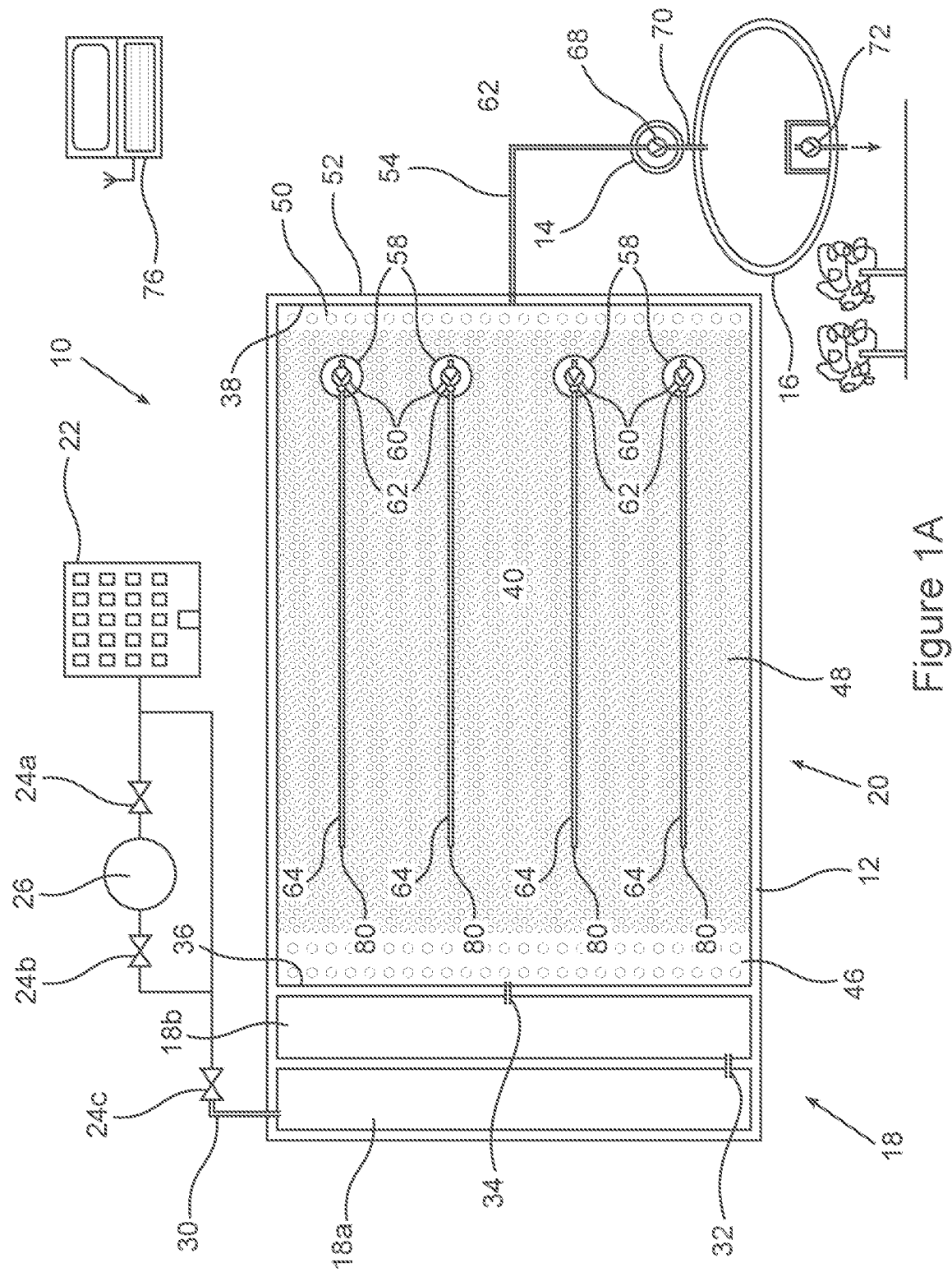
FIGS. 1A and 1B schematically depict an embodiment of a wastewater treatment device according to the teachings herein in top view (FIG. 1A) and side cross section (FIG. 1B)

The invention, in some embodiments, relates to the field of wastewater treatment and more particularly, but not exclusively, to methods and devices that are useful for microbial treatment of wastewater.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As discussed in the introduction, there is a need to for a wastewater treatment device for microbial processing of wastewater such as blackwater, grey water, stormwater runoff and combinations thereof. It is advantageous that such a device be relatively small and/or process wastewater relatively quickly and/or use relatively little energy during operation so that such a device is economical.

Herein, the Inventors disclose a wastewater treatment device that, depending on the embodiment, has one or more advantages over wastewater treatment devices known in the art. The device comprises a microbial processing container defining an internal volume (in some preferred embodiments, consists essentially of a single microbial processing container having a single internal volume) in which both aerobic and anaerobic digestion of waste in the wastewater is performed, and is operated with substantially continuous aeration of the wastewater. In some embodiments, aeration comprises pumping wastewater held in the processing container using a circulation pump, aerating the pumped wastewater using a Venturi air pump, and returning the aerated wastewater to near the surface of the aerobic layer.

In preferred embodiments, the device is operated for continuous processing of wastewater, that is to say, the rate of influent wastewater addition to the processing container is substantially the same as the rate of effluent water outflow from the processing container. That said, the total volume of liquid held in the processing container can change during operation so that the level of water in the processing container can change. For example, in periods where there is lesser inflow (e.g., at night), outflow of effluent may continue so that the water level in the processing container drops. If the inflow of influent is higher than the outflow of effluent, the water level increases. In preferred embodiments, the difference between the lowest water level and the highest water level in the processing container is at least 5 cm.

In some preferred embodiments, the device uses substantially less energy for operation compared to known wastewater processing devices having a similar processing capacity. Specifically, in preferred embodiments, aeration is provided primarily, and preferably exclusively, by one or more Venturi air pumps functionally associated with wastewater circulation pumps. It has been found that the use of the Venturi air pumps together with the circulation pumps in the specific claimed arrangement provides circulation and wastewater aeration at a very low energy cost, the wastewater circulation and aeration sufficient to allow quick and effective aerobic digestion of waste in the wastewater.

In preferred embodiments, the microbial population in the processing container is native, that is to say, no seeding with selected organisms is performed. Instead, digestion is performed with whatever organisms are found in the processing container and waste.

In some preferred embodiments, the device is devoid of components for heating or cooling the wastewater during processing. The circulation pumps are either submerged for cooling or do not require separate cooling components, while the heat released by the aerobic and anaerobic digestion is sufficient to maintain the wastewater at conditions suitable for efficient digestion.

Embodiments of the device may be used for treating any wastewater, especially wastewater comprising or consisting of wastewater selected from the group consisting of blackwater, greywater, stormwater runoff or any combination thereof.

In some preferred embodiments, the device produces no sludge or biomass such as algae as a product to be disposed of, rather primarily gases such as $CO_2$ that are optionally released into the environment together with pathogen-free odor-free effluent-water that is suitable for use in irrigation. In some embodiments, the influent wastewater has a BOD (biochemical oxygen demand) and TSS (total suspended solids) both greater than 100 mg/L, while the effluent water has a BOD and TSS both less than 10 mg/L.

Wastewater Treatment Device

According to an aspect of some embodiments of the teachings herein, there is provided a wastewater treatment device, comprising:

a. a microbial processing container defining an internal volume that, when positioned for operation has a top and a bottom at a depth of at least about 3.25 m from the top, wherein:

a bottom-most horizontal layer of the internal volume at least 1 m deep (i.e., the vertical dimension of the layer is at least 1 m) is designated as an anaerobic layer that during operation of the device is filled with wastewater;

a horizontal layer of the internal volume immediately above the anaerobic layer and at least 2 m deep (i.e., the vertical dimension of the layer is at least 2 m) is designated as an aerobic layer that during operation of the device is substantially filled with wastewater; and a horizontal layer of the internal volume immediately above the aerobic layer (and preferably at least 0.25 m deep) is designated as a humid layer and during operation of the device substantially contains a gas;

b. a wastewater inlet positioned to direct influent wastewater into the aerobic layer of the internal volume;

c. a water outlet positioned to remove water from the aerobic layer of the internal volume as effluent, the water outlet at least one meter distant from the wastewater inlet and at least 2 meters above the bottom of the internal volume;

d. at least one water circulation pump, each such water circulation pump having:

a pump inlet positioned to draw water from the aerobic layer and/or the anaerobic layer at least 1 meters below the top of the internal volume, and a pump outlet positioned to expel drawn water to a portion of the internal volume corresponding to the aerobic layer at least 1.5 meter above the bottom of the internal volume, wherein the pump inlet is positioned deeper in the internal volume than the pump outlet;

e. a Venturi air pump positioned on a water conduit between the water circulation pump and each associated pump outlet, the Venturi air pump having a motive fluid inlet, a side inlet in fluid communication with ambient air and a Venturi outlet, so that water pumped by the water circulation pump into the motive fluid inlet and flowing towards the associated circulation pump outlet via the Venturi outlet draws ambient air through the side inlet to aerate the pumped water; and f. particulate substrate at least about 3.25 tri-deep filling the anaerobic layer, the aerobic layer and the humid layer of the internal volume.

In some embodiments, the wastewater is pumped primarily or exclusively from the aerobic layer. In such embodiments, the pump inlet(s) of the circulation pump(s) is/are positioned to draw water primarily or exclusively from the aerobic layer, most preferably from the aerobic layer in close proximity to the anaerobic layer, e.g., within 50 cm, and even more preferably within 30 cm of the anaerobic layer.

Alternatively, in some preferred embodiments, the wastewater is pumped from the boundary of the aerobic and anaerobic layers so that the pump inlet(s) of the circulation pump(s) is/are positioned to concurrently draw water from the aerobic layer/anaerobic layer boundary.

Alternatively, in some especially preferred embodiments, the wastewater is pumped primarily or exclusively from the anaerobic layer. In such embodiments, the pump inlet(s) of the circulation pump(s) is/are positioned to draw water primarily or exclusively from the anaerobic layer. Such an embodiment is depicted in FIG. 1B. In such embodiments, it is preferred that the inlet(s) are positioned to drawn wastewater from at least about 0.5 m from the bottom of the anaerobic layer, in preferred embodiments at least about 0.5 and not more than about 1 m from the bottom.

The choice from where to draw the wastewater into the inlet(s) of the circulation pump(s) is in a large pail dependent on the nature of the wastewater being processed, although, as discussed herein, it has been found that drawing wastewater from the anaerobic layer is particularly effective for processing combined blackwater/greywater.

As noted above, parts of the processing container are designated as an anaerobic layer, as an aerobic layer and as a humid layer. The designation in as of itself does not reflect a physical or practical limitation of a part of the container, but is intended to assisted in understanding the description herein. For example, during operation of the device, different populations of bacteria develop in different depths of the processing container. There is no sharp division of aerobic and anaerobic bacteria populations, instead there is a continuous variation so that shallower parts of the processing container have proportionally more aerobic bacteria while deeper parts of the processing container have proportionally more anaerobic and even anoxic bacteria. Thus, some anaerobic digestion may occur in what is designated as the aerobic layer and some aerobic digestion may occur in what is designated as the anaerobic layer. Further, where as during normal operation the part that is designated humid layer always contains gas without wastewater and the part that is designated anaerobic layer is always filled with wastewater, the part that is designated the aerobic layer is substantially filled with wastewater: most of the aerobic layer is mostly filled with wastewater, but an upper portion of the designated aerobic layer may contain a gas when the amount of wastewater in the processing container is less than the maximal normal capacity.

Microbial Processing Container

The processing container is a container with water-tight walls that define the internal volume that is filled with particulate substrate configured to hold wastewater that is processed by the device. When positioned for operation, the processing container has a top and a bottom at a depth of at least about 3.25 m from the top.

The walls are made of any suitable material, preferably made of a material or coated with a material that is resistant to wastewater. In some embodiments, the walls are made of concrete, especially reinforced concrete that is coated with a protective layer such as a bituminous coating.

In some embodiments, the processing container is a fixed construction built at a location for use at that location without provision for moving the container. In typical such embodiments, the container is built primarily of concrete or stone or dirt embankments.

Alternatively, in some embodiments, the processing container is a movable, typically manufactured in one place, then transported (pre-assembled or as a kit for assembly) to a location for installation and use.

The processing container is optionally at least partially built into, contained in, or buried in the ground. In the experimental section is described an immobile prototype device which processing container walls were made of reinforced concrete built into the side of a hillslope.

The shape of the container (as seen from above) is any suitable shape, e.g., round, square, rectangular. In preferred embodiments, the container (as seen from above) has a distal end and a proximal end allowing flow of water from the proximal end towards the distal end. In some such preferred embodiments, the container (as seen from above) has straight sides between a distal end and a proximal end allowing substantially parallel flow of water from the proximal end towards the distal end across the entire width of the container.

In some embodiments, the bottom of the processing container is flat so that the depth of the internal volume is relatively constant. In alternative embodiments, the bottom of the processing container is sloped, so that the depth of the container varies. In some preferred embodiments, the processing container has a distal end and a proximal end, wherein at least part of the bottom of the processing container is monotonously sloped so that the distal end is deeper than the proximal end.

The volume of the processing container is any suitable volume and is determined by the amount of wastewater that is to be processed in a given time period. The capacity of the processing container, being the volume of wastewater that is held in the processing container, is the total volume of the processing container less the volume of the particulate substrate. In typical embodiments, a device according to the teachings herein processes the capacity of the processing container in 24 hours or less, so that the volume of the processing container is preferably such that the capacity is equal or greater than the expected volume of influent wastewater. In some embodiments, the capacity is at least 10 m$^3$, at least 50 m$^3$ and even at least 100 m$^3$. In the experimental section is described a prototype device having a capacity of 300 m$^3$ but the Inventors intend to build further devices having a greater capacity, e.g., not less than 500 m$^3$, not less than 1000 m$^3$ and even not less than 1500 m$^3$.

In preferred embodiments, during operation the internal volume of the processing container is filled with wastewater at least three meters deep and is divided into three horizontal layers designated the anaerobic layer, the aerobic layer above the anaerobic layer and the humid layer above the aerobic layer.

Anaerobic Layer

The bottom-most horizontal layer of the internal volume is designated the anaerobic layer containing wastewater at least 1 meter deep from the bottom of the container. During operation of the device, wastewater in the aerobic layer typically has an $O_2$ content of not more than 2 corresponding to anaerobic and/or anoxic digestion conditions. In the anaerobic layer, anaerobic and anoxic microorganisms growing on the particulate substrate digest waste that settles from the aerobic layer including waste produced by aerobic digestion such as remnants of dead aerobic microorganisms.

As noted above, in some embodiments the circulation pumps of the device draw water from the aerobic layer or from the boundary between the aerobic and anaerobic layers (see FIG. 2) and expel the drawn (and subsequently oxygenated water) to the aerobic layer. As a result, in such embodiments the device is thereby configured so that wastewater in the anaerobic layer undergoes no substantial (Preferably only incidental) circulation. Consequently, the actual oxygen content in the anaerobic layer is a gradient where wastewater closer to the upper portion of the anaerobic layer and near the aerobic layer has a substantially higher oxygen content while the wastewater closer to the lower portion of the anaerobic layer and near the bottom of the internal volume has a lower oxygen content, in some preferred embodiments being anoxic. In some embodiments, such a gradient allows for a varied population of anaerobic/anoxic microorganisms able to digest varied types of waste in the wastewater.

As noted above, in alternative embodiments the circulation pumps of the device draw water from the anaerobic layer (see FIG. 1B) and expel the drawn (and subsequently oxygenated water) to the aerobic layer. As a result, in such embodiments the device is thereby configured so that wastewater in the anaerobic layer undergoes circulation with a lesser oxygen-content gradient than described immediately hereinabove. A prototype device having circulation pumps that draw water exclusively from the anaerobic layer was found to have unexpectedly efficient digestion of waste in wastewater despite having a lesser oxygen-content gradient.

In some embodiments, the device further comprises at least one oxygen sensor functionally associated with at least one location in the anaerobic layer. In some such embodiments, during operation of the device, an operator or an automated system periodically monitors the concentration of $O_2$ in the one or more locations in the anaerobic layer. In such embodiments, if the $O_2$ concentration in the anaerobic layer is higher than a designated level (e.g., greater than 2 mg/automated or manual steps can be taken, for example, reducing the rate of in-flow of influent wastewater into the internal volume of the processing container so that the aerobic bacteria, in the aerobic layer have more time to consume $O_2$, or reducing the extent of oxygenation performed by the circulation and Venturi air pumps thereby reducing the $O_2$ concentration also in the anaerobic layer.

Aerobic Layer

A horizontal layer of the internal volume immediately above the anaerobic layer and at least 2 m deep is designated the aerobic layer and during operation of the device is (mostly) filled with wastewater and typically has an $O_2$ content of greater than 2 corresponding to aerobic digestion conditions. In the aerobic layer, aerobic microorganisms growing on the particulate substrate digest waste dissolved in or suspended in the wastewater. Foul-smelling gases that are generated in the anaerobic layer rise into and are dissolved in the wastewater of the aerobic layer to be aerobically digested therein. It has been found that when the aerobic layer is at least 2 m deep, no foul smell is detected coming from the device. The water level in the processing container typically changes during operation of the device so that the depth of the wastewater in the aerobic layer changes accordingly and, with lower wastewater levels, an upper portion of the aerobic level is filled with gas rather than liquid. As noted above, the wastewater in the aerobic layer is continuously aerated by the Venturi air pumps so that the wastewater therein has a relatively high $O_2$ content allowing for quick and efficient aerobic digestion.

In some embodiments, the aerobic layer is physically separated from the anaerobic layer by a physical water-permeable barrier, for example, a textile barrier such as geotextile. In some embodiments, such a barrier may reduce the rate of diffusion of water between the two layers but does not prevent such diffusion. In some embodiments, such a barrier physically separates the substrate particles of the anaerobic layer from the substrate particles of aerobic layer, especially during construction of the device.

In some embodiments, the device further comprises at least one oxygen sensor functionally associated with at least one location in the aerobic layer, preferably close to the anaerobic layer. In some such embodiments, during operation of the device, an operator or an automated system periodically monitor the concentration of $O_2$ in the one or more locations in the aerobic layer. In such embodiments, if the $O_2$ concentration in the aerobic layer is lower than a designated level (e.g., less than 2 mg/L), automated or manual steps can be taken, for example, increasing the circulation and oxygenation rate thereby increasing the $O_2$ concentration in the wastewater in the aerobic layer.

Due to the efficient aeration provided by the device, the majority of digestion of waste in the wastewater is provided in the aerobic layer so it is preferable that the volume of the aerobic layer be greater than the volume of the anaerobic layer. The ratio of volume of the aerobic layer to the volume of the anaerobic layer is any suitable ratio. In some embodiments, the volume of the aerobic layer is at least 2 times that of the anaerobic layer, in some embodiments at least 3 times, at least 4 times, at least 5 times and even at least 6 times that of the anaerobic layer. In the experimental section is described a prototype device having an aerobic layer with a volume 7 times that of the anaerobic layer.

Humid Layer

A horizontal layer of the internal volume immediately above the aerobic layer (and preferably at least 0.25 in deep)

is designated a humid layer and during operation of the device substantially contains, in addition to the particulate substrate, a gas. It is preferred that when a maximal amount of wastewater is in the device, the wastewater reached the top of the aerobic layer and does not encroach into the humid layer. The gas in the humid layer comprises water vapor (e.g., that has evaporated from the surface of the aerobic layer), ambient atmospheric gas, and gases (such as $CO_2$) released from the aerobic layer due to digestion of waste. Without wishing to be held to any one theory, it is currently hypothesized that the humid layer has a relatively high $CO_2$ content compared to ambient air, in some embodiments sufficient to prevent survival of insects in the humid layer and on the surface of the wastewater.

In preferred embodiments, at least 50%, at least 60%, at least 80% and preferably at least 90% of the top portion of the internal volume of the processing container is in communication with ambient air through the particulate substrate of the humid layer. In some alternative embodiments, at least some of the top portion of the internal volume of the processing container is covered with a cover impermeable to gases, in some such embodiments, at least 50% and even at least 60% of the top portion of the internal volume of the processing container is covered with a cover impermeable to gases.

Particulate Substrate

The internal volume of the processing container of a device according to the teachings herein is at least partially filled with particulate substrate at least about 3.25 meters deep. The substrate fills all three layers of the internal volume: the anaerobic layer, the aerobic layer and the humid layer.

In the anaerobic and aerobic layers the substrate provides a high-surface area on which microorganisms develop in sessile mode to digest waste in the wastewater.

In the humid layer, the substrate prevents sunlight from penetrating into the processing container, thereby reducing evaporation of wastewater and preventing the growth of algae in the processing container. Further, in the humid layer the substrate allows for the flow of gas into and out of the processing container, e.g., when the level of wastewater rises or falls, or gas released by microorganisms as a result of the digestion of waste in the wastewater. Further, as noted above, the substrate in the humid layer apparently traps sufficient CO2 gas released by bacteria to render the humid layer and the upper surface of the wastewater inhospitable to the development of insects such as flies and mosquitoes.

In preferred embodiments, the substrate in the processing container is well-packed and the substrate constituting the top of the humid layer is flat and level, allowing a person to walk thereupon, allowing access to various parts of the device.

In some embodiments, the top of the substrate which constitutes the top of the humid layer is configured to support the growth of embryophytes (non-algae greent plants). In some embodiments, the device further comprises embryophytes rooted in the top of the substrate.

The substrate in the internal volume is at least about 3.25 tri deep, thereby allowing an at least 1 m deep anaerobic layer, an at least 2 m deep aerobic layer and a 0.25 m deep humid layer. In some embodiments, the substrate is more than about 3.25 m deep.

Substrate Material

The substrate is of particles of any material that is inert to wastewater. Preferably, the substrate is porous, thereby having a higher surface area per unit volume. In preferred embodiments the substrate is a mineral medium such as rock, slag (especially lower coal slag) or concrete, for example, porous rocks such as tuff and pumice, concrete fragments, lower coal slag and combinations thereof. In some embodiments, all of the substrate particles are of the same material. In alternative embodiments, there are at least two populations of substrate particles, each one of the populations being of a different material.

Size of Substrate Particles

The size of the particles of the substrate is any suitable size that is not so small as to prevent flow of wastewater in the internal volume especially when microbial growth is sufficient to block the passages between the substrate particles, but not so big so that the surface area of the substrate is too small to maintain a sufficient microbial population for efficient digestion of waste in wastewater.

In some embodiments, such as when the medium is made of minerals, such as concrete, tuff or pumice, not more than 5% by weight of the particulate substrate in the aerobic and the anaerobic layers has a size of less than 0.5 cm and not more than 5% by weight of the particulate substrate has a size of greater than 15 cm.

In some embodiments, the size of at least 95% by weight of the substrate particles in the aerobic and the anaerobic layers is at least 0.75 cm, at least 1 cm and even at least 1.5 cm.

In some embodiments, the size of at least 95% by weight of the substrate particles in the aerobic and the anaerobic layers is less than 10 cm, less than 8 cm, less than 6 cm and even less than 5 cm.

In some embodiments, all of the particulate substrate in the internal volume is of the same size. In some embodiments, the different layers of the internal volume have a different particulate substrate size. Specifically, in some embodiments, the average size of the particulate substrate in the anaerobic layer is larger than the average size of the particulate substrate in the aerobic layer and in the humid layer. Larger substrate size in the anaerobic layer provides less resistance to flow of water while smaller substrate size in the aerobic layer provides more surface area for microbial growth and smaller substrate size in the humid layer provides a more comfortable and/or aesthetic upper surface.

In some embodiments, the size of at least 95% by weight of the substrate particles in the aerobic layer is at least 0.75 cm and not more than 4 cm. In some such embodiments, the size of at least 95% by weight of the substrate particles in the aerobic layer is at least 1 cm and even at least 1.5 cm. In some such embodiments, the size of at least 95% by weight of the substrate particles in the aerobic layer is not more than 3.5 cm, not more than 3 cm and even not more than 2.5 cm.

In some embodiments, the size of at least 95% by weight of the substrate particles in the anaerobic layer is at least 1.5 cm and not more than 6 cm. In some such embodiments, the size of at least 95% by weight of the substrate particles in the anaerobic layer is at least 2 cm and even at least 2.5 cm. In some such embodiments, the size of at least 95% by weight of the substrate particles in the aerobic layer is not more than 5.5 cm, not more than 5 cm and even not more than 4.5 cm.

In some embodiments, the anaerobic layer is filled with substrate particles having a size of 2 cm to 5 cm, the aerobic layer is filled with substrate particles having a size of 1 cm to 3 cm and the humid layer is filled with substrate particles having a size of 0.2 cm to 0.7 cm. Specifically, in the experimental section is described a prototype device where the anaerobic layer was filled with larger particles of tuff having a size of 2 cm to 5 cm, the aerobic layer filled with medium sized particles of tuff having a size of 1 cm to 3 cm and the humid layer having smaller sized particles of tuff having a size of 0.2 cm to 0.7 cm.

Wastewater Inlet and Wastewater Pre-Preprocessing

A device according to the teachings herein comprises a wastewater inlet positioned to direct influent wastewater into the aerobic layer of the internal volume of the processing container.

The wastewater inlet is typically an opening in a conduit that brings wastewater to the processing container. The size of the conduit is any suitable size and depends on the processing capacity of the device and the required influent rate.

To prevent release of foul odors, the wastewater inlet is preferably entirely submerged in the wastewater in the aerobic layer, preferably at a depth of between 25 cm and 1 m from the surface of the wastewater. To ensure that the wastewater inlet is submerged despite changes in the amount of wastewater held in the internal volume, in preferred embodiments the top of the wastewater inlet is at least 25 cm from the bottom of the humid layer/top of the aerobic layer. Accordingly, in some embodiments the wastewater inlet is at least 50 cm and even at least 75 cm from the top of the processing container. In some embodiments, the wastewater inlet is preferably not more than 1.5 m and even not more than 1.25 m from the top of the processing container.

In some embodiments, a device includes a single conduit that functions as a wastewater inlet. In some embodiments, a device includes multiple discrete conduits that together function as a wastewater inlet. Multiple discrete conduits distribute influent wastewater in the aerobic layer, but cost more to build.

In the experimental section is described a prototype device having a 6" (25.4 cm) diameter inlet conduit which center is 1 m from the top of the processing container.

As noted above, in some embodiments the average size of substrate particles in the aerobic layer is relatively small (e.g., having a size of 1 cm to 3 cm) to increase the substrate surface area available for microbial growth at the expense of increasing the resistance to flow of wastewater in the aerobic layer. In some embodiments, in proximity of the wastewater inlet or inlets there is an inlet zone of the aerobic layer where the average size of substrate particles is higher than in other parts of the aerobic layer allowing quicker diffusion of influent wastewater to parts of the aerobic distant from the wastewater inlets. Such an inlet zone allows influent wastewater to more quickly diffuse in a larger part of the aerobic layer, allowing for quicker dilution and waste digestion. In some embodiments (such as the prototype device described in the experimental section), the length of the internal volume is defined as the dimension between a wall in proximity of the wastewater inlet and a wall in proximity of the water outlet, the width of the internal volume is a dimension perpendicular to the length dimension, and the inlet zone is configured for quicker diffusion of influent wastewater in the width dimension.

In some embodiments, such an inlet zone is separated from the rest of the aerobic layer by a water-permeable barrier, for example, a textile barrier such as geotextile. In some embodiments, such a barrier reduces the rate of diffusion of water between the inlet zone and the rest of the aerobic layer, assisting in distribution of influent wastewater in the inlet zone. In some embodiments, such a barrier physically separates the substrate particles of the inlet zone from the substrate particles of the rest of the aerobic layer, especially during construction of the device.

In some embodiments, the influent wastewater enters the processing container through the wastewater inlet from the source of wastewater as-is without any pre-processing.

In some embodiments, the wastewater undergoes pre-processing to filter-out large waste (e.g., branches, large sheets of paper). Accordingly, in some embodiments the device further comprises a filter functionally associated with the wastewater inlet so that wastewater entering the internal volume first passes through the filter.

In some embodiments, the wastewater undergoes pre-processing to remove floaters (waste that is less dense than water such as oil) and sinkers (waste that is denser than water, such as sand). Suitable components for pre-processing of wastewater by removing floaters and sinkers such as oil-grit separators for are commercially available. Accordingly, in some embodiments the device further comprises a pre-processing component functionally associated with the wastewater inlet for removing floaters and sinkers from influent wastewater Water Outlet A device according to the teachings herein comprises a water outlet positioned to remove water from the aerobic layer of the internal volume as effluent, the water outlet at least one meter distant from the wastewater inlet and at least 2 meters above the bottom.

The water outlet is typically an opening in a conduit that allows outflow of processed water from the aerobic layer of the processing container. The size of the conduit is any suitable size and depends on the processing capacity of the device and required effluent outflow rate.

The water outlet is preferably distant from a wastewater inlet to avoid the possibility of substantially undiluted and unprocessed wastewater entering the processing container through the wastewater inlet reaching the water outlet. In some embodiments, the water outlet is at least one meter distant from a wastewater inlet, in preferred embodiments at least 2 m, at least 3 m, at least 4 m and even at least 5 m distant.

The water outlet is configured to remove water from any portion of the aerobic layer, preferably from a portion of the aerobic layer that is close to the surface of the wastewater held in the internal volume of the processing chamber. In some embodiments, the water outlet is at least 2 meters from the bottom, in some embodiments reducing the possibility that foul-smelling water from the anaerobic layer reaches the water outlet. In some embodiments, the water outlet is within 1 meter of the highest water level of the internal volume of the processing container, within 75 cm and even within 50 cm of the highest water level of the internal volume.

In some embodiments, the water outlet is functionally-associated with an outlet pump which actively removes processed water from the aerobic layer. A disadvantage of such embodiments is the added expense of an outlet pump which requires maintenance and can fail.

In some preferred embodiments, the water outlet is a passive component (e.g., an open conduit) which lowest part defines the lowest water level of the processing container. In such embodiments, as long as the water level in the internal volume is higher than the lowest part of the water outlet, water flows out of the internal volume of the processing container through the water outlet. When the water level is the same or lower as the lower part of the water outlet, water outflow and wastewater processing continues without outflow through the water outlet. An advantage of such embodiments is simplicity and safety so that there is no possibility of too much water being removed from the processing container. Such embodiments are also self-regulating as effluent outflow stops when wastewater inflow stops and the water level drops sufficiently but effluent outflow resumes when wastewater inflow resumes.

In some embodiments, a device includes a single conduit that functions as a water outlet. In some embodiments, a device includes multiple discrete conduits that together function as a water outlet.

In some embodiments, in proximity of the water outlet there is an outlet zone of the aerobic layer where the average size of substrate particles is higher than in other parts of the aerobic layer allowing quicker diffusion of water from other parts of the aerobic zone.

In some embodiments, such an outlet zone is separated from the rest of the aerobic layer by a water-permeable barrier, for example, a textile barrier such as geotextile. In some embodiments, such a barrier reduces the rate of diffusion of water between the outlet zone and the rest of the aerobic layer. In some embodiments, such a barrier physically separates the substrate particles of the outlet zone from the substrate particles of the rest of the aerobic layer, especially during construction of the device.

Water Circulation Pump and Venturi Air Pump

A device according to the teachings herein comprises: at least one water circulation pump, each one of the at least one water circulation pump having:

a pump inlet positioned to draw water from the aerobic layer and/or the anaerobic layer at least 1 meters below the top of the internal volume of the processing container, and a pump outlet positioned to expel drawn water to a portion of the internal volume corresponding to the aerobic layer at least 1.5 meter above the bottom of the internal volume of the processing container, wherein the pump inlet is positioned deeper in the internal volume than the pump outlet;

e. a Venturi air pump positioned on a water conduit between the circulation pump and each associated pump outlet, the Venturi air pump having a motive fluid inlet, a side inlet in fluid communication with ambient air and a. Venturi outlet, so that water pumped by the water circulation pump into the motive fluid inlet and flowing towards the circulation pump outlet via the Venturi outlet draws ambient air through the side inlet to aerate the pumped water.

Circulation Pump

A device according to the teachings herein comprises one or more water circulation pumps. In preferred embodiments, a total pumping capacity of the device, being the sum of the pumping capacity of all the circulation pumps, is preferably at least 1.5 times the wastewater holding capacity of the internal volume of the processing container/day, and even more preferably at least 1.6, at least 1.7, at least 1.8 and most preferably even at least 1.9 times the wastewater holding capacity of the internal volume of the processing container. In the experimental section is described a prototype device where the total pumping capacity of the four circulation pumps is at least 2 times the water-holding capacity of the internal volume/day.

In preferred embodiments, the device comprises a number of circulation pumps greater than 1, e.g., a number selected from the group of at least two, at least three and even at least four circulation pumps. In preferred such embodiments, the pumping capacity of one less than all of the circulation pumps is preferably at least 1.5, at least 1.6, at least 1.7, at least 1.8 and most preferably even at least 1.9 times the wastewater holding capacity of the internal volume of the processing container/day. In such embodiments, if one pump fails or is off-line for maintenance, the device still has sufficient pumping capacity for normal operation. That said, since pumps are relatively expensive to acquire and operate, and because repairing or replacing a non-functional pump can typically be done in a short time, e.g., a few hours, that on the scale of wastewater processing is unlikely to lead to the release of dangerously unprocessed wastewater, in some embodiments there is no need for such excess pumping capacity.

Any suitable pump can be used as a water circulation pump. In some preferred embodiments, a circulation pump used does not require active cooling. In some preferred embodiments, a circulation pump is a submersible pump that is cooled by contact with the water held in the internal volume of the processing container.

It has been surprisingly found that the energy requirements for operating the circulation pumps of some embodiments of the device are modest compared to wastewater processing devices known in the art. In some embodiments, the total energy requirement for operation of all of the circulation pumps of a device of the teachings herein having a capacity of 300 $m^3$/day is not more than 0.2 $kWh/m^3$, not more than 0.1 $kWh/m^3$, not more than 0.08 $kWh/m^3$ and even not more than 0.06 $kWh/m^3$ (as was experimentally demonstrated using the prototype device described in the experimental section). This is in contrast to the typical energy consumption of comparable known wastewater processing devices which energy requirements is about 0.25 $kWh/m^3$ ("Energy Consumption in Wastewater Treatment Plants in China" by Xie and Wang in a paper from the World Congress on Water, Climate and Energy Conference at Dublin, Ireland in May 2012; DOI:10.13140/2.1.1228.9285).

In some embodiments, the energy requirements for operation of the wastewater treatment device are sufficiently low to allow for a particularly environmentally-friendly configuration of the device. Specifically, the device is functionally-associated with a photovoltaic solar panel array, the array comprising one or more solar panels that produce electrical power when illuminated by sunlight. Preferably the footprint of the array is not more than 10% greater than the surface area of the microbial processing container and even more preferably the footprint of the array is not greater than surface area of the microbial processing container. In preferred embodiments, such a solar panel array provides more than all of the electric power requirements for operation of the device between at least 10:00 and 15:00 during at least six months of the year for most terrestrial locations between ±40° latitude of the equator. In some such embodiments, the excess electrical power generated by the array is preferably stored to operate the wastewater treatment device when there is less sunlight, especially at night. Although any suitable electrical power storage component maybe used, in preferred embodiments, the wastewater treatment device comprises a gravitational energy-storing component. A gravitational energy-storing component comprises a water reservoir into which clean effluent water from the water outlet is stored when there is sufficient electrical power generated by the solar panel array. When desired, water is released from the water reservoir through a generator (e.g., comprising a water-mill or a turbine) that generates electrical power so that combined electrical power generated by the generator and by the solar panel array is sufficient to operate the wastewater device. Accordingly, in some embodiments the device further comprises:

a water reservoir with a reservoir inlet and a reservoir outlet associated with a valve having an open and closed state;

a conduit providing fluid communication between the reservoir inlet and at least one other component of the device (such as the water outlet) so that the conduit is configured to direct effluent water from the at least one component into the water reservoir through the reservoir inlet for storage in the water reservoir;

a valve functionally-associated with the reservoir outlet having a closed state where water does not flow out of the water reservoir through the reservoir outlet and an open state where water flows out of the water reservoir through the reservoir outlet; and a generator configured to generate electricity from water flowing out of the water reservoir through the reservoir outlet.

In some embodiments, the conduit and/or reservoir inlet are functionally-associated with a water pump that, when activated, actively pumps effluent water through the conduit and the reservoir inlet into the water reservoir. Additionally or alternatively, the device is configured so that at least some effluent water can passively flow through the conduit and the reservoir inlet into the water reservoir.

In some embodiments, at least some of the volume of the water reservoir is lower than the internal volume of the processing container. In some such embodiments, the reservoir outlet and the generator are located below the processing container (e.g., a lower portion of a hill on which the processing container is located).

Alternatively, in some embodiments at least some of the volume of the water reservoir is higher than the internal volume of the processing container. In some such embodiments, the reservoir outlet and the generator are located above the processing container a higher portion of a hill on which the processing container is located and/or the water reservoir is a water tower or similar component).

Pump Inlet

Each circulation pump has a pump inlet positioned to draw water from the anaerobic and/or aerobic layer at least 1 meters below the top of the internal volume of the processing container, and in some embodiments at least 1.5 meters and even at least 1.9 meters below the top of the internal volume of the processing container.

It is preferred that a pump inlet is positioned deep underwater (below the surface of the wastewater held in the processing container) so as to draw water that potentially has a lower than average oxygen content. Further, drawing water from deeper provides more effective circulation of water: drawing water from deep in the internal volume of the processing container causes water located above to sink, moving deeper.

In some embodiments, the pump inlet(s) of the circulation pump(s) is/are positioned to draw water exclusively from the aerobic layer, most preferably from the aerobic layer in close proximity to the anaerobic layer, e.g., within 50 cm, within 40 cm of the anaerobic later, within 30 cm of the anaerobic layer and even within 15 cm of the anaerobic layer. In preferred such embodiments, the pump inlet is positioned so that the drawing does not lead to substantial circulation and preferably any circulation, of water in the anaerobic zone. Without wishing to be held to any one theory, it is currently believed that preventing substantial, and even any, circulation of water in the anaerobic layer provides for a gradient of decreasing oxygen content with greater depth in the anaerobic layer which provides for more efficient anaerobic digestion. In some embodiments where the aerobic and anaerobic layers are separated by a physical barrier, it is preferred that the pump inlet is positioned to remove water from the aerobic layer close to the physical barrier, e.g., with 50 cm, within 40 cm, within 30 cm and even within 15 cm of the barrier.

Figure 2:
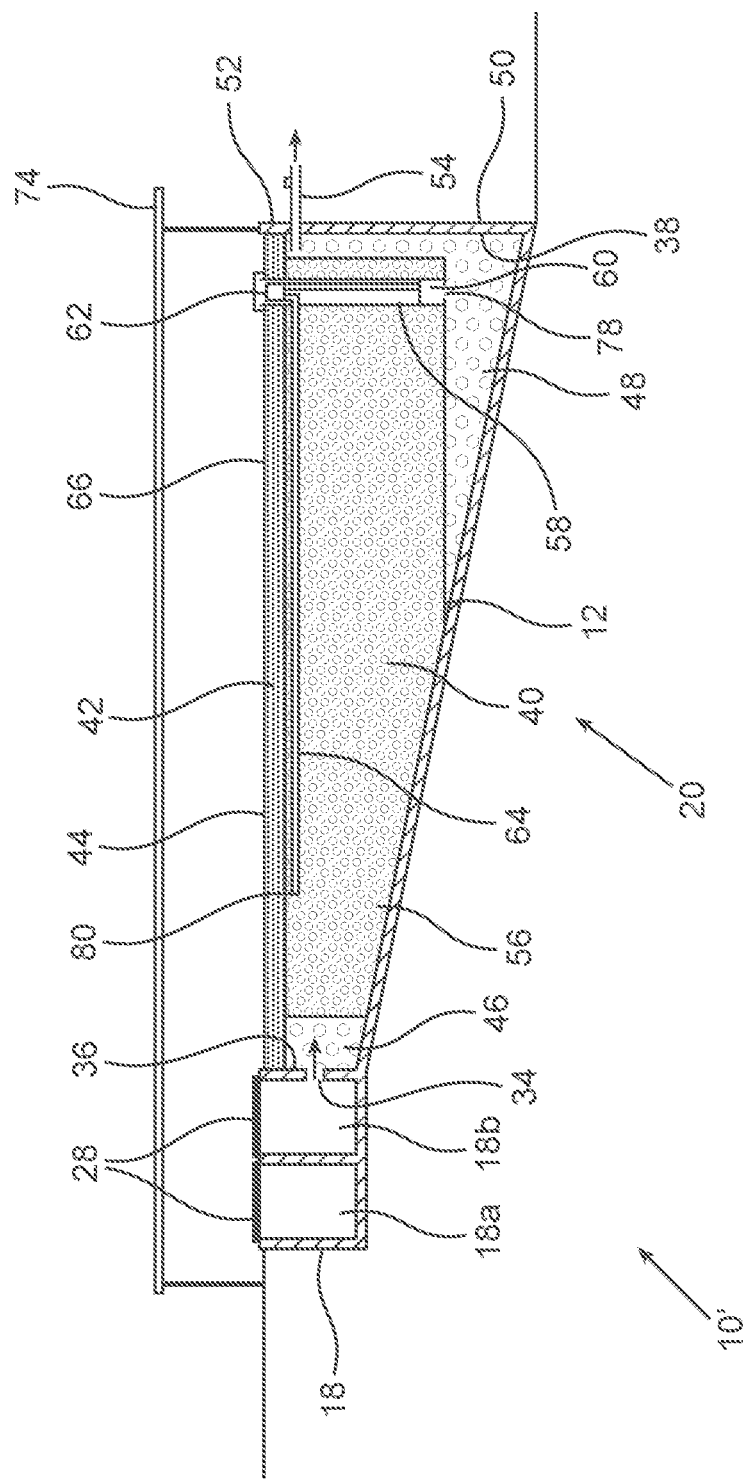
FIG. 2 schematically depicts an alternative embodiment of a wastewater treatment device according to the teachings herein in side cross section.

Alternatively, in some preferred embodiments, the wastewater is pumped from the boundary of the aerobic and anaerobic layers so that the pump inlet(s) of the circulation pump(s) is/are positioned to draw water from the aerobic layer anaerobic layer boundary. Such an embodiment is depicted in FIG. 2

Alternatively, in some preferred embodiments, the wastewater is pumped exclusively from the anaerobic layer so that the pump inlet(s) of the circulation pump(s) is/are positioned to draw water exclusively from the anaerobic layer. Such an embodiment is depicted in FIG. 1B. In such embodiments, it is preferred that the inlet(s) are positioned to drawn wastewater from at least about 0.5 iii from the bottom of the anaerobic layer, in preferred embodiments at least about 0.5 and not more than about 1 m from the bottom.

It is currently believed that the efficacy of oxygenation in terms of energy use for amount of oxygen added to the water, is increasingly efficient with increasing depth from which the water is drawn because the deeper water has a lower oxygen content. Circulation efficiency is greater the deeper the water is drawn because a greater proportion of the water held in the processing container is circulated.

However, it was originally thought that drawing water from the aerobic layer close to the anaerobic layer and, even more so, from the aerobic/anaerobic boundary or the anaerobic layer would lead to the emission of foul smells from the device due to the fact that the deeper the water is, the greater the concentration of foul-smelling gases emitted by the anaerobic bacteria, It has been surprisingly found that drawing water from deep in the processing container, even from the anaerobic layer does not lead to the emission of foul smells. Apparently, the aeration of the water by In some embodiments, the device consists of a single circulation pump inlet. Such embodiments are typically small-scale devices having a relatively low wastewater holding capacity (e.g., 10-20 m$^3$).

In preferred embodiments, even in embodiments having a relatively low wastewater holding-capacity, the device comprises at least two circulation pump inlets, the circulation pump inlets positioned at least 1 m distant one from the other. In some embodiments, the device comprises at least three and even at least four circulation pump inlets. Without being held to any one theory, it is currently believed that such positioning increases the homogeneity of wastewater circulation (because wastewater across the entire width of the processing container is relatively close to an inlet), so that the oxygen content in the wastewater in the entire aerobic layer is close to being the same thereby providing efficient aerobic digestion in the entire aerobic layer and helping to prevent formation of pockets of low-oxygen content water in the aerobic layer. Further, in embodiments having multiple circulation pump inlets, the velocity of water drawn into each water inlet is modest when compared to the velocity of the same volume of water drawn into a single water inlet. Without wishing to be held to any one theory, it is currently believed that a lower drawing velocity provides better mixing of water in the internal volume of the processing container, helps prevent damage to the sessile microbial growth that develops on the particulate substrate, and reduces (and possibly helps prevent) the development of planktonic microbes in the water held in the internal volume of the processing container.

In preferred embodiments, the circulation pump inlet or inlets are positioned distant from the wastewater inlet, e.g., at least about 3 m, at least about 5 m, at least about 6 tri and even at least about 8 m distant. Additionally or alternatively, in some embodiments, a wastewater inlet is near one end of the internal volume, e.g., within about 2 m, within about 1 m, within about 50 cm and even at the end of the internal volume; and the circulation pump inlet or inlets are near an opposite end of the internal volume, e.g., within about 4 m, within about 3 m and even within about 2 m of the opposite end of the internal volume. Without wishing to be held to any one theory, it is currently believed that positioning of the circulation pump inlet or inlets distant from the wastewater inlet provides superior circulation and mixing of water in the aerobic layer of the internal layer of the processing container. Such superior mixing provides highly efficient digestion and also leads to quick dilution of waste in influent wastewater in the bulk of the aerobic layer, so that effluent processed water is of sufficient quality for release and use.

In some embodiments, each circulation pump of a device has a single associated pump inlet. In some embodiments, at least one circulation pump of a device has two or more different pump inlets associated therewith. In some embodiments, at least two circulation pumps of a device share at least one pump inlet. In some embodiments, at least one pump inlet is configured to draw water from two separate locations, e.g. the pump inlet comprises at least two separate openings, for example, one or more of the pump inlets is a manifold.

In preferred embodiments, the device comprises at least one circulation pump inlet for each 4 m of width, more preferably at least one circulation pump inlet for each 3.5 m of width, and even more preferably at least one circulation pump inlet for each 3 m of width, where it is preferred that multiple pump inlets are within 1 m of colinearity with a line perpendicular to the flow axis.

In the experimental section is described a prototype device with reference to FIG. 1B having four circulation pumps, each circulation pump having a single inlet, the inlets positioned to draw water exclusively from the anaerobic layer water about 50 cm above the bottom of the anaerobic layer. The inlets are positioned 1.4 m one from the other and within 2.5 meter of end of the internal volume that is opposite of the end where the wastewater inlet is positioned. The distance from the nearest circulation pump inlet to the wastewater inlet was approximately 17.6 m.

In the experimental section is described a device with reference to FIG. 2 having four circulation pumps, each circulation pump having a single inlet, the inlets positioned to draw water exclusively from the aerobic layer from within 15 cm of the anaerobic layer/aerobic layer boundary without substantially leading to circulation of water in the anaerobic layer. The inlets are positioned 1.4 m one from the other and within 2.5 meter of end of the internal volume that is opposite of the end where the wastewater inlet is positioned. The distance from the nearest circulation pump inlet to the wastewater inlet was approximately 17.6 in.

Pump Outlet

Each circulation pump has a pump outlet positioned to expel drawn and aerated water to a portion of the internal volume corresponding to the aerobic layer at least 1.5 m above the bottom of the internal volume of the processing container. In preferred embodiments, the pump outlet is positioned to expel drawn water close to the surface of the water held in the internal volume of the processing container. In some such embodiments, the center of a pump outlet is within 30 cm, within 20 cm and even within 20 cm of the lowest water level designated for normal operation of the device. Additionally or alternatively, in some such embodiments, the center of a pump outlet is within 30 cm, within 20 cm and even within 20 cm of the highest water level designated for normal operation of the device. It has been surprisingly found that despite the presumed presence of some foul-smelling gases in the drawn water that is released close to the surface of the water, there is no detectable foul smell emanated from the device. Without wishing to be held to any one theory, the lack of detectable foul smell is believed to be a result of the efficient digestion of such gases in the aerobic layer, the efficient aeration of water drawn by the Venturi air pumps and the effective dilution of wastewater by the circulation pumps.

In some preferred embodiments, at least one of the pump outlet or outlets is submerged in the water held in the internal volume of the processing container, even when the water level is the lowest water level designated for normal operation of the device. In some such embodiments, when the water level in the internal volume is lowest, the top of the pump outlet is with 5 cm, within 4 cm within 3 cm, within 2 cm and even within 1 cm of the upper surface of the water held in the internal volume.

In some alternative preferred embodiments, at least one of the pump outlet or outlets is submerged in the water held in the internal volume of the processing container when the water level is the highest water level designated for normal operation of the device. In some such embodiments, when the water level in the internal volume is highest, the top of the pump outlet is with 5 cm, within 4 cm, within 3 cm, within 2 cm and even within 1 cm of the upper surface of the water held in the internal volume but typically, when the water level is not at the highest at least part of the pump outlet or outlet is not submerged.

In some alternative preferred embodiments, at least one of the pump outlet or outlets is at least partially outside (not submerged) of the water held in the internal volume of the processing container even when the water level is the highest water level designated for normal operation of the device. In some such embodiments, when the water level in the internal volume is highest, the top of the pump outlet is with 5 cm, within 4 cm, within 3 cm, within 2 cm and even within 1 cm of the upper surface of the water held in the internal volume.

In some embodiments, the device consists of a single circulation pump outlet. Such embodiments are typically small-scale devices having a relatively low wastewater holding capacity (e.g., 10-20 $m^3$).

In preferred embodiments, even in embodiments having a relatively low wastewater holding capacity, the device comprises at least two circulation pump outlets, the circulation pump outlets positioned at least 1 m distant one from the other. In some embodiments, the device comprises at least three and even at least four circulation pump outlets. Without being held to any one theory, it is currently believed that such positioning increases the homogeneity of circulation, so that the oxygen content in the entire is aerobic layer is closer to being the same thereby providing efficient aerobic digestion in the entire aerobic layer and helping to prevent formation of pockets of low-oxygen content water in the aerobic layer. Further, in embodiments having multiple circulation pump outlets, the velocity of water expelled from each water outlet is modest when compared to the velocity of the same volume of water expelled from a single water outlet. Without wishing to be held to any one theory, it is currently believed that a lower expelling velocity helps prevent damage to the sessile microbial growth that develops on the particulate substrate, and reduces (and possibly helps prevent) the development of planktonic microbes in the water held in the internal volume of the processing container.

In some preferred embodiments, the circulation pump inlet or inlets are positioned close to the wastewater inlet, e.g., within 5 m and even within 4 m of the wastewater inlet. Additionally or alternatively, in some embodiments, a wastewater inlet is near one end of the internal volume, e.g., within 2 m, within 1 m, within 50 cm and even at the end of the internal volume; and the circulation pump outlet or outlets are near the same end of the internal volume, e.g., within 4 m and even within 3 m of the same end of the internal volume.

Additionally or alternatively, in some preferred embodiments, the circulation pump inlet or inlets are positioned close to the wastewater inlet, e.g., within 5 m and even within 4 m of the wastewater inlet. Additionally or alternatively, in some embodiments, a wastewater inlet is near one end of the internal volume, e.g., within 2 m, within 1 m, within 50 cm and even at the end of the internal volume; and the circulation pump outlet or outlets are near the same end of the internal volume, e.g., within 4 m and even within 3 m of the same end of the internal volume.

Additionally or alternatively, in preferred embodiments, the circulation pump outlet or outlets are positioned distant from the water outlet of the internal volume of the processing container, e.g., at least 3 m, at least 5 m, at least 6 m and even at least 7 in distant from the water outlet. Additionally or alternatively, in some embodiments, the circulation pump outlet or outlets are near an end of the internal volume, e.g., within 4 m and even within 3 in of an end of the internal volume and a water outlet is near the opposite end of the internal volume, e.g., within 2 in, within 1 in, within 50 cm and even at the opposite end of the internal volume.

Additionally or alternatively, in some preferred embodiments such as the prototype described in the experimental section, a wastewater inlet of the internal volume is positioned at or near an end of the internal volume, a water outlet of the internal volume is positioned at or near an opposite end of the internal volume, and the circulation pump outlet or outlets are positioned between the two ends so that drawn water is expelled from the pump outlet or outlets between the wastewater inlet and water outlets.

Additionally or alternatively, in some preferred embodiments such as the prototype described in the experimental section, circulation pump outlet or outlets are positioned at or near an end of the internal volume and the circulation pump inlet or inlets are positioned at or near an opposite end of the internal volume. In some embodiments, the distance between a circulation pump outlet and circulation pump inlet is not less than 4 in, not less than 5 in and even not less than 6 m.

Without wishing to be held to any one theory, it is currently believed that the above-described positionings of the circulation pump outlet or outlets (whether one positioning implemented alone or any two, three, four or five positionings implemented together in any combination) provide superior circulation and mixing of water in the aerobic layer of the internal volume of the processing container to provide highly efficient digestion and quick dilution of waste in influent wastewater in the bulk of the aerobic layer.

In some embodiments, each circulation pump of a device has a single associated pump outlet. In some embodiments, at least one circulation pump of a device has two or more different pump outlets associated therewith. In some embodiments, at least two circulation pumps of a device share at least one pump outlet. In some embodiments, at least one pump outlet is configured to expel water to two separate locations, e.g. the pump owlet comprises at least two separate openings, for example, one or more of the pump outlets is a manifold.

In preferred embodiments, the device comprises at least one circulation pump outlet for each 4 m of width, more preferably at least one circulation pump outlet for each 3.5 m of width, and even more preferably at least one circulation pump outlet for each 3 m of width, In the experimental section is described a prototype device having four circulation pumps, each circulation pump having a single outlet. The outlets are positioned 1.4 in one from the other and within 2.5 meters of the end of the internal volume where the wastewater inlet is positioned.

In some embodiments, such as exemplified by the prototype device described in the experimental section, the processing container is considered to have a proximal end, a distal end, a flow axis from the proximal end to the distal end and a width perpendicular to the flow axis. The wastewater inlet is positioned near (and preferably at) the proximal end. The water outlet is positioned near (and preferably at) the distal end. The circulation pump inlet or inlets are positioned at least one meter below the top of the internal volume, and preferably even deeper as discussed above, and located relatively close to the distal end as discussed above. Preferably the device comprises at least one circulation pump inlet for each 4 in of width, more preferably at least one circulation pump inlet for each 3.5 in of width, and even more preferably at least one circulation pump inlet for each 3 m of width, where it is preferred that multiple pump inlets are within 1 m of colinearity with a line perpendicular to the flow axis. The circulation pump outlet or outlets are positioned at least 1.5 m above the bottom of the internal volume, and preferably close to the surface of the wastewater as discussed above, and located relatively close to the proximal end as discussed above. Preferably the device comprises at least one circulation pump outlet for each 4 m of width, more preferably at least one circulation pump outlet for each 3.5 m of width, and even more preferably at least one circulation pump outlet for each 3 m of width, where it is preferred that multiple pump outlets are within 1 m of colinearity with a line perpendicular to the flow axis. Such embodiments preferably include a low flow-resistance input zone and/or a low flow-resistance outlet zone as discussed above. In some embodiments, the bottom of the processing container slopes monotonically, being increasingly deeper from the proximal end (the shallow end) to the distal end (the deep end). Without wishing to be held to any one theory, it is currently believed that such configuration provides a continuous cyclical flow of wastewater through the substrate from the proximal end towards the distal end, where near the distal end, some water exits the internal volume of the processing container through the water outlet (preferably from near the top of the processing container, while some of the water is moved from close to the distal end back to close to the proximal end. Without wishing to be held to any one theory, it is currently believed that in such embodiments, the presumed continuous cyclical flow is at least partially responsible for the efficient and quick processing of waste in the wastewater.

Venturi Air Pump

A device according to the teachings herein comprises a Venturi air pump positioned on a water conduit between a circulation pump and an associated pump outlet, the Venturi air pump having a motive fluid inlet, a side inlet in fluid communication with ambient air and a Venturi outlet, so that water pumped by the water circulation pump into the motive fluid inlet and flowing towards the circulation pump outlet via the Venturi outlet draws ambient air through the side inlet to aerate the pumped water. Venturi air pumps are well-known in the art of wastewater treatment for aeration of wastewater. Any suitable Venturi air pump, including Venturi air pumps known in the art may be used for implementing the teachings herein. A Venturi air pump that are suitable for understanding and implementing the teachings herein is described in US 2018/0043316.

As noted above, on a water conduit between a circulation pump and an associated pump outlet there is a Venturi air pump so that the circulation pump drives drawn wastewater into the motive fluid inlet of the Venturi air pump. The wastewater flows through the Venturi air pump to the Venturi outlet and into the water conduit towards the pump outlet. Due to the Bernoulli effect, as the water passes through the Venturi air pump, ambient air is drawn into the water through a side inlet, thereby aerating the pumped water.

In some embodiments, a. Venturi air pump has a single side inlet in fluid communication with ambient air while in some alternative embodiments the Venturi air pump has multiple side inlets in fluid communication with ambient air.

In some embodiments, on a water conduit between a specific circulation pump and a specific outlet there is a single Venturi air pump.

In some alternative embodiments, on a water conduit between a specific circulation pump and a specific outlet there are multiple (at least two) Venturi air pump. In some such embodiments, at least two of the multiple Venturi air pumps are arranged in series on the water conduit. alternatively or additionally, in some such embodiments, at least two of the multiple Venturi air pumps are arranged in parallel on the water conduit.

Finishing Pond

The efficacy of the wastewater processing is such that the water effluent from the water outlet is of high quality, devoid of foul smells and pathogens, and is suitable for irrigation. That said, in preferred embodiments, effluent water existing the processing container via the water outlet is held in a finishing pool prior to disposal, for example, use in irrigation, release into a body of water or into nature. Thus, in some embodiments, a device of the teachings herein further comprises a finishing pool for receiving effluent from the water outlet and retaining the effluent water therein for a period of time.

A finishing pool is generally shallow (not more than 120 cm deep) and has a volume sufficient to retain effluent water for not less than 1 hour, preferably for not less than 2 hours.

In some preferred embodiments, water in the finishing pool is exposed to ambient air and sunlight.

In some preferred embodiments, water plants (e.g., water hyacinth plants (*Eichhornia crassipes*)) grow in the finishing pool. Such water plants oxygenate the water, reducing (and even preventing) the growth of algae in the finishing pool and oxygenating the water.

Disinfectant

The efficacy of the wastewater processing is such that the water effluent from the water outlet is of high quality, devoid of foul smells and pathogens, and is suitable for irrigation. However, in some places there is a legal requirement for disinfection of water effluent made from processed blackwater and/or greywater. Accordingly, in some embodiments, the device further comprises a disinfection unit functionally associated with the water outlet, the disinfection unit configured to disinfect water exiting the internal volume through the water outlet to ensure that no pathogens survive in the water. In some embodiments, the disinfection unit is configured to add a chemical disinfectant such as chlorine gas or hypochlorite to the water. Typically, such disinfection units also include a dissipation pool or similar component that allows the chemical disinfectant to dissipate (e.g., into the environment) so that the disinfected water can safely be used for irrigation of plants. In embodiments that include a solarization pool, the disinfection is performed to water that is removed from the solarization pool.

Roof

In some embodiments, a device further comprises a roof positioned over the top of the processing container. The nature of the roof typically depends on the climate where the device is located. For example, in climates with little precipitation and much sunlight, the function of the roof is typically primarily to provide shade for operators and can be of suspended netting. For example, in climates with much precipitation, the function of the roof may also be to prevent entry of substantial precipitation into the internal volume of the processing container which may lead to overflow of water.

EXPERIMENTAL

Figure 1B:
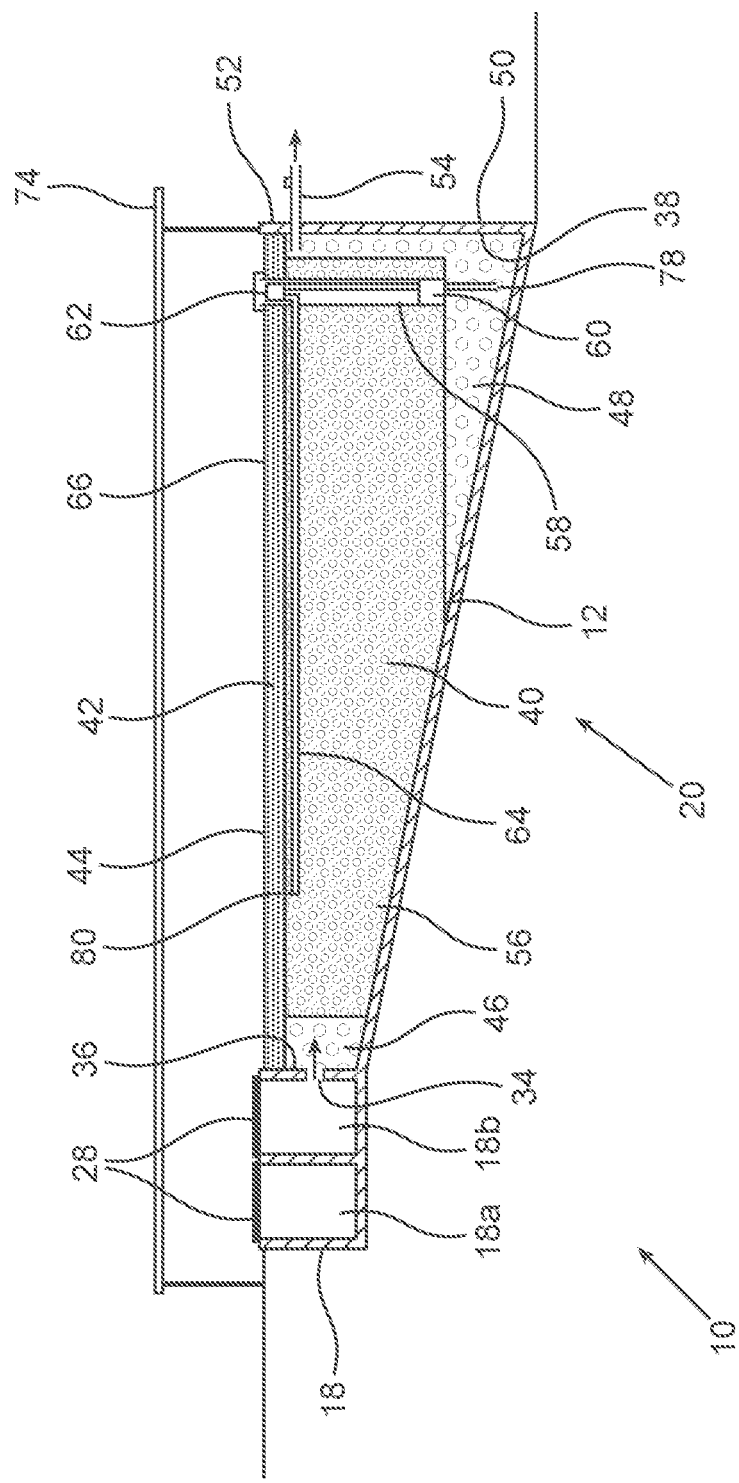

An embodiment of a wastewater treatment device 10 according to the teachings herein was built and is schematically depicted in FIG. 1A (top view, with a layer removed) and in FIG. 1B (side cross section). A different embodiment of the device, device 10' that is similar to device 10 with only a minor difference is depicted in FIG. 2 in side cross section.

Device 10 included a rectangular 19 m long by 11 m (inner dimensions) processing enclosure 12, a pump pool 14 and an oval finishing pool 16. Processing enclosure 12 was made of 20 cm thick reinforced concrete walls and included three main partitions: two compartments of a fat/sediment separator 18 and a processing container 20.

Source of Wastewater

Device 10 was constructed to process wastewater (combined blackwater and greywater) from dormitories 22. Device 10 was configured to process a total of 300 m$^3$ wastewater/day received at a maximal rate of 21 m$^3$/hour. To avoid challenges caused by a sudden unexpectedly high rate production of wastewater, regulation valves 24a, 24b and 24c could be opened and closed to direct wastewater received from dormitories 22 directly to device 10, from dormitories 22 to overflow reservoir 26, or from overflow reservoir 26 to device 10, as required.

Fat/Sediment Separator 18

Fat/sediment separator 18 comprised two parallel rectangular compartments 18a and 18b at the proximal end of processing enclosure 12, both 11 m wide, 1.5 m long and 1.85 m deep, thereby each having an internal volume of 30 m'. Movable LDPE lids 22 (not depicted in FIG. 1A) covered both compartments 18a and 18b to prevent escape of foul smells.

A 6" (15.24 cm) HDPE separator inlet 30 directed received waste into compartment 18a at a maximal rate of 21 m$^3$/hour so the retention time in compartment 18a was at least 1.4 hours. Denser-than-water contaminants (sinkers) settled to the bottom of compartment 18a while floating contaminants (floaters) floated to the top and were removed with the use of a commercially-available skimmer.

Wastewater passed from compartment 18a to compartment 18b through a 6" HDPE separator conduit 32. The center of separator conduit 32 was positioned 1 m above the bottom of compartments 18a and 18b. In compartment 18b, any remaining sinkers or floaters would separate from the wastewater. Wastewater passed from compartment 18b to processing container 20 through 6" HDPE wastewater inlet 34. The center of wastewater inlet 34 was positioned 1 m above the bottom of compartment 18b. As with compartment 18a, the retention time in compartment 18b was at least 1.4 hours.

Processing Container 20

As seen in FIG. 1A, from-above processing container 20 was rectangular in shape, 11 m wide and 15.6 m long. As seen in FIG. 1B, in side cross section, processing container 20 was a truncated right triangle being 1.85 m deep at a proximal end 36 and linearly sloping to a maximal depth of 5.0 in at a distal end 38. The volume of the internal volume 40 of processing container was 500 m$^3$. At a maximal input/output rate of 21 m$^3$/hour, the retention time of wastewater in processing container 20 was slightly more than 23 hours.

As a particulate substrate, internal volume 40 was filled with three different grades of tuff larger tuff having a size of 2 cm to 5 cm, medium tuff having a size of 1 cm to 3 cm and smaller tuff having a size of 0.2 cm to 0.7 cm.

As seen in FIG. 1B, a 15 cm thick upper layer 42 of the smaller tuff that was flush with the top edges of processing container 20 defined a flat and level upper surface 44 of the top of internal volume 40. Upper layer 42 constituted the humid layer of device 10. A person could easily walk on upper surface 44. Weeds were seen to grow on upper surface 44, apparently due to the hospitable conditions there. Upper layer 42 is not depicted in FIG. 1A.

At proximal end 36, an inlet zone 46 1.65 m deep, spanning the entire width of processing container 20 and 60 cm long contained the larger tuff. Wastewater entering inlet zone 46 from compartment 1813 through wastewater inlet 34 easily flowed through the relatively large gaps between the larger tuff particles to distribute into the entire volume of inlet zone 46.

Filling the bottom 8 in of internal volume 20 from distal end 38 was an anaerobic layer 48 which had a maximal depth of 1.5 m at distal end 38. Anaerobic layer 48 contained the larger tuff. The larger tuff was preferred so that water could more easily flow throughout anaerobic layer 48.

Contacting distal end 38 of processing chamber 20 and extending from the top of anaerobic layer 48 to the bottom of upper layer 42 was a 50 cm long column of the larger tuff constituting an outlet zone 50. There was no physical border or barrier between anaerobic layer 48 and outlet zone 50.

Passing through a distal wall 52 of processing container 20 was a 6" HDPE outlet conduit 54 that provided fluid communication between internal volume 40 and pump pool 14. The inlet of outlet conduit 54 was centered 2.5 m from the top edge of processing container 20 and was located so that water from outlet zone 50 entered outlet conduit 54.

Bordering inlet zone 46, anaerobic layer 48, outlet zone 50 and upper layer 42 and physically separated therefrom with geotextile cloth was aerobic layer 56. Aerobic layer 56 contained the medium tuff. The geotextile cloth provided a physical water-permeable barrier to ensure that the different-sized particulate substrate (tuff) of the different layers and zones did not mix during the construction of device 10. Presumably, with time, the substrate particles in each layer mutually bonded due to the developed bacterial layers. At proximal end 36, aerobic layer 56 was 1.6 m deep and followed the slope of the bottom of internal volume 40 to become 3 m deep. Over the entire length of anaerobic layer 48, aerobic layer 56 was a constant 3 m deep, well above the minimum 2 m depth desired to absorb foul smells released by anaerobic layer 48.

Passing vertically through upper layer 42 and aerobic layer 56 to the boundary of anaerobic layer 48 were four shafts 58, each shaft 58 centered 2 m from distal end 38, the walls of each shaft made of 700 mm ID/842 mm OD socketed twinwall drainage pipes of HDPE with a corrugated outer surface. The walls of shafts 58 were impermeable to water so that there was no fluid communication between aerobic layer 56 and the inner volume of shafts 58. Shafts 58 were empty of particulate substrate The bottom end of each drainage pipe defining each shaft rested on the geotextile cloth that separated anaerobic layer 48 from aerobic layer 56. During construction, most or all of the geotextile cloth that was originally present at the opening of the drainage pipes was removed and a 4 mm thick plate of polycarbonate was placed on top of the larger tuff that was apparent at the bottom of the shaft. The poly carbonate plate provided a flat and stable surface on which a circulation pump 60 rested.

An inlet 78 of each circulation pump 60 passed 1 m deeper than the level of the geotextile cloth into anaerobic layer 48 so that each circulation pump 60 could draw water from anaerobic layer 48. Each circulation pump 60 drove wastewater drawn in from a respective pump inlet 78 through an associated Venturi air pump 62. The wastewater was aerated by ambient air drawn into the side holes of Venturi air pump 62 and entered an aerated-water conduit 64. Each aerated-water conduit 64 carried aerated wastewater from a respective Venturi air pump 62 in a proximal direction towards proximal end 36. The open end of each aerated-water conduit 64 constituted a pump outlet 80 of device 10, each pump outlet 80 opening out inside aerobic layer 56, 3 m from proximal end 36 of internal volume 40 and 45 cm deep below top surface 44 and therefore 30 cm below the boundary between upper layer 42 and aerobic layer 56. The aerated wastewater was thereby directed into aerobic layer 56, 3 m from proximal end 36 of internal volume 36 and 45 cm deep from top surface 44.

In FIG. 2, a variant device 10' depicted was configured to draw wastewater from just below the geotextile that defined the boundary between the aerobic layer 56 and the anaerobic layer 48 so that inlets 78 of circulation pumps 60 in device 10' were located at the boundary of aerobic layer 56 and anaerobic layer 48. Most of the water drawn into inlets 78 was from the anaerobic layer although some of the water likely was from the aerobic layer and passed through the geotextile to enter inlets 78.

In a non-depicted embodiments similar to device 10', the inlets are positioned to pass through the walls of shafts 58 and thereby to draw water primarily or even entirely from the aerobic layer.

As noted above, the uppermost portion of internal volume 40 included a 15 cm deep upper layer 42 of the smaller tuff that constituted the humid layer of device 10. Device 10 was designed to operate so that the wastewater level could fluctuate by 30 cm (corresponding to a difference of 50 m$^3$ wastewater). At maximal operating capacity, the wastewater level was 15 cm from the top of processing container 20 and flush with the bottom of upper layer 42. Accordingly, at any given moment of normal operation of device 10. the depth of the portion of internal volume 36 that was filled primarily with gas and not wastewater fluctuated between 15 cm (when internal volume 40 contained the maximal amount of wastewater) and 45 cm (when internal volume 40 contained less wastewater). As a result, pump outlets 80 of device 10 ordinarily introduced aerated water into the uppermost part of aerobic layer 56, at the surface of the wastewater (when the wastewater was at a lowest level) and 30 cm below the surface of the wastewater (when the wastewater was at a highest level, flush with the bottom of upper layer 42.

Pump Pool 14

Pump pool 14 was made of 20 cm thick reinforced concrete walls. Pump pool 14 was cylindrical with inner dimensions of 1 m deep and a radius of 1.25 m, thereby having a capacity of 4.9 m$^3$.

Pump pool 14 was in fluid communication with internal volume 40 of processing container 20 through outlet conduit 54 so that processed wastewater continuously flowed from internal volume 40 into pump pool 14 as long as the water level in internal volume 40 was sufficiently high.

Inside pump pool 14 was an submersible transfer pump 68 with a pumping capacity of 25 m$^3$/hour. The outlet of transfer pump 68 was functionally associated with transfer conduit 70 which provided fluid communication with finishing pool 16.

When activated, transfer pump 68 transferred processed water from pump pool 14 to finishing pool 16 through transfer conduit 70.

Transfer pump 68 was functionally-associated with a sensor that monitored the water level in pump pool 14. When the water level in pump pool 14 was close to overflowing (e.g., 1 cm from the top of pump pool 14), transfer pump 68 was activated to transfer the processed water to finishing pool 16. Once activated, transfer pump 68 continued transferring processed water until the water level reached a pre-designated lower level, typically a level where the water level was still sufficient to keep transfer pump 68 sufficiently submerged to prevent overheating.

Finishing Pool 16

Finishing pool 16 was made of 20 cm thick reinforced concrete walls. From above, finishing pool 16 was oval having 5.5 m by 3 m inner dimensions, vertical walls and a depth of 1 in, thereby having a surface area of 52 m2 and a volume of approximately 52 m$^3$.

Inside finishing pool 16 was submersible finishing pool outlet pump 72 with a pumping capacity of 25 m$^3$/hour. The outlet of outlet pump 72 was functionally associated with a downstream irrigation system so that herbs and fruit trees were irrigated with processed wastewater from finishing pool 16.

As noted above, transfer conduit 70 brought processed wastewater into finishing pool 16 to fill finishing pool 16 with processed wastewater from pump pool 14 at a maximal rate of 21 m$^3$/hour. As a result, the wastewater had a retention time of ~2.5 hours in finishing pool 16, substantially greater than the minimally preferred 2 hours.

Growing in finishing pool 16 were water hyacinth plants (*Eichhornia crassipes*), known for their utility in absorbing nutrients and heavy metals from water as well as for preventing algal growth.

Roof

In device 10, suspended two meters above top surface 44 was a roof 74 of black polycarbonate sheets to prevent rainwater from falling into internal volume 40 and to provide shade for people maintaining device 10.

Controller

Device 10 further comprised a controller 76 (a general purpose computer specially configured with software) in wireless communication with regulation valves 24, circulation pumps 60, pump pool transfer pump 68 and finishing pool outlet pump 72 to control operation thereof including activation/deactivation and pumping speed. In embodiments including sensors such as pH sensors and oxygen level sensors, controller 76 was in wireless communication with such sensors to receive data therefrom.

Operation of Device 10

Device 10 was operated to accept a mixture of blackwater and greywater from student dormitories as wastewater. The processing capacity was up to 300 m$^3$ wastewater/day at a maximal rate of 21 m$^3$/hour. No seeding was performed so that the bacterial population that developed and was established on the particulate substrate (toof) was native bacteria.

The total power requirement for operating device 10 for operating the nine pumps was minimal, only ~10% of the power requirement for operating prior art wastewater processing devices with a 300 m$^3$ wastewater/day capacity.

After 1 month of operation when the bacterial population was established on the particulate substrate, the wastewater received from the dormitories (as measured at compartment 18b of fat/sediment separator 18 had a BOD (biological oxygen demand) of greater than 100 mg/L, and a TSS (total suspended solids) or greater than 100 mg/L. After processing (as measured in pump pool 16), the processed water had a BOD (biological oxygen demand) of less than 10 mg/L and a TSS (total suspended solids) or less than 10 mg/L. People who stood on top surface 44 noted that there was no noticeable smell.

As noted in the description above, the walls of shafts 58 were impermeable to water so that there was no fluid communication between the aerobic layer and the inner volume of shafts 58. Since the bottom end of each drainage pipe rested on the tuff of anaerobic layer 48, the only water in the inner volume of shafts 58 in which circulation pumps 60 were immersed was water from anaerobic layer 48. However, when the covers of shafts 58 were removed, no foul smell was perceived. Apparently, a sufficient population of planktonic aerobic bacteria developed inside the inner volume of shafts 58 to digest and neutralize any foul smelling materials from anaerobic layer 48.

Specifically, the Inventors constructed a prototype having a processing chamber able to hold 300 m$^3$ water and that was able to process up to 300 m$^3$/day wastewater (combined greywater and blackwater) at a maximal input rate of 24 m$^3$/hour. The prototype included four electrical circulation pumps each having a pumping capacity of 6.5 m$^3$/hour and functionally associated with a Venturi air pump, using a total of 5.5 kW/hour whereas comparable systems typically require ten times that amount of electricity. The four circulation pumps with functionally associated Venturi air pumps together circulated and aerated 26 m$^3$/hour or 624 m$^3$/day, just 4% more than a pumping/aeration capacity of twice the processing chamber capacity per day.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. As used herein, the indefinite articles "a" and "an" mean "at least one" or "one or more" unless the context clearly dictates otherwise.

As used herein, when a numerical value is preceded by the term "about", the term "about" is intended to indicate +/−10%. As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C). (B and C) or (A and B and C).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A wastewater treatment device, comprising:
    a. a microbial processing container defining an internal volume that, when positioned for operation, has a top and a bottom at a depth of at least about 3.25 m from said top, wherein:
        a bottom-most horizontal layer of said internal volume at least 1 m deep is designated as an anaerobic layer that during operation of the device is filled with wastewater;
        a horizontal layer of said internal volume immediately above said anaerobic layer and at least 2 m deep is designated as an aerobic layer that during operation of the device is substantially filled with wastewater; and
        a horizontal layer of said internal volume immediately above said aerobic layer is designated as a humid layer that during operation of the device substantially contains a gas;
    b. a wastewater inlet positioned to direct influent wastewater into said aerobic layer of said internal volume;
    c. a water outlet positioned to remove water from said aerobic layer of the internal volume as effluent, said water outlet at least one meter distant from said wastewater inlet and at least 2 meters above said bottom of said internal volume;
    d. at least one water circulation pump, each such said water circulation pump having:
        a pump inlet positioned to draw water from said aerobic layer and/or said anaerobic layer at least 1 meter below said top of said internal volume, and a pump outlet positioned to expel drawn water to a portion of said internal volume corresponding to said aerobic layer at least 1.5 meter above the bottom of said internal volume, wherein said pump inlet is positioned deeper in said internal volume than said pump outlet;
    e. a Venturi air pump positioned on a water conduit between said water circulation pump and each associated said pump outlet, said Venturi air pump having a motive fluid inlet, a side inlet in fluid communication with ambient air and a Venturi outlet, so that water pumped by said water circulation pump into said motive fluid inlet and flowing towards said pump outlet via said Venturi outlet draws ambient air through said side inlet to aerate said pumped water; and
    f. particulate substrate at least about 3.25 m-deep filling said anaerobic layer, said aerobic layer and said humid layer of said internal volume.

2. The device of claim 1, wherein a total pumping capacity of the device provided by all said at least one water circulation pump or pumps is at least 1.5 times the wastewater holding capacity of said internal volume of said processing container/day.

3. The device of claim 1, wherein said humid layer is at least 0.25 m deep.

4. The device of claim 1, wherein said humid layer and said aerobic layer are separated by a physical water-permeable barrier which barrier defines a humid/aerobic boundary.

5. The device of claim 1, wherein said aerobic layer and said anaerobic layer are separated by a physical water-permeable barrier which barrier defines an aerobic/anaerobic boundary.

6. The device of claim 1, wherein said pump inlet or inlets is positioned to draw water from said anaerobic layer.

7. The device of claim 1, wherein said pump inlet or inlets is positioned to draw water from a boundary between said aerobic layer and said anaerobic layer.

8. The device of claim 1, wherein said pump inlet or inlets is positioned to draw water from said aerobic layer.

9. The device of claim 1, wherein said at least one circulation pump is located inside an inner volume of a shaft that during operation of the device is filled with water, said shaft providing a substrate-free channel from a top of said humid layer, through said humid layer and into said aerobic layer.

10. The device of claim 9, wherein said shaft is defined by a water-permeable shaft-wall that allows fluid communication between said inner volume of said shaft and said aerobic layer.

11. The device of claim 9, wherein said shaft is defined by a water-impermeable shaft-wall that prevents fluid communication between an inner volume of said shaft and said aerobic layer, said shaft configured to allow fluid communication between said inner volume of said shaft and said anaerobic layer.

12. The device of claim 1, wherein the volume of said aerobic layer is at least 2 times that of said anaerobic layer.

13. The device of claim 1, wherein not more than 5% by weight of said particulate substrate in said aerobic layer and in said anaerobic layer has a size of less than 0.5 cm and not more than 5% by weight of said particulate substrate in said aerobic and in said anaerobic layers has a size of greater than 15 cm.

14. The device of claim 1, wherein the average size of said particulate substrate in said anaerobic layer is larger than the average size of said particulate substrate in said aerobic layer and in said humid layer.

15. The device of claim 1, said anaerobic layer filled with substrate particles having a size of 2 cm to 5 cm, said aerobic layer filled with substrate particles having a size of 1 cm to 3 cm and said humid layer filled with substrate particles having a size of 0.2 cm to 0.7 cm.

16. The device of claim 1, said aerobic layer comprising an inlet zone in proximity of said wastewater inlet where an average size of substrate particles is greater than in other parts of said aerobic layer.

17. The device of claim 1, said aerobic layer comprising an outlet zone in proximity of said water outlet where an average size of substrate particles is greater than in other parts of said aerobic layer.

18. The device of claim 1, wherein said pump outlet or outlets is positioned to expel drawn water to a portion of said internal volume corresponding to said aerobic layer within 50 cm of a boundary between said aerobic layer and said humid layer.

19. The device of claim 1, wherein:
  said wastewater inlet and said at least one circulation pump outlet are near a proximal end of said processing container;
  said water outlet and said at least one circulation pump inlet or inlets are near a distal end of said processing container; and
  said at least one circulation pump is deeper in said processing container than said at least one circulation pump outlet,
so that: when the device is in operation, wastewater in said processing container moves cyclically:
  from said at least one circulation pump outlet, down and towards said distal end of said processing container substantially parallel to a proximal end-distal end axis of said processing container towards said at least one circulation pump inlet, into said at least one circulation pump inlet, through said at least one water circulation pump, up and towards said proximal end of said processing container.

20. A method for processing wastewater, comprising:
  a. providing a device of claim 1; and
  b. adding influent wastewater to be processed through said wastewater inlet into said internal volume of said processing container and removing effluent water from said processing container through said water outlet,
wherein the rate of said adding said influent wastewater and said removing said effluent water is such that the residence time of water in said internal volume is at least 12 hours and not more than 48 hours so that said effluent water is suitable for irrigation.

* * * * *